(12) United States Patent
Boscher et al.

(10) Patent No.: US 9,999,901 B2
(45) Date of Patent: Jun. 19, 2018

(54) METHOD FOR MANUFACTURING A SUPERHYDROPHOBIC SURFACE, SURFACE SO OBTAINED AND USE OF IT

(71) Applicant: Luxembourg Institute of Science And Technology (LIST), Esch/Alzette (LU)

(72) Inventors: Nicolas Boscher, Audun le Tiche (FR); David Duday, Luxembourg (LU); Patrick Choquet, Longeville les Metz (FR); Stephane Verdier, Audun le Tiche (FR)

(73) Assignee: Luxembourg Institute of Science And Technology (LIST), Luxembourg (LU)

( * ) Notice: Subject to any disclaimer, the term of this patent is extended or adjusted under 35 U.S.C. 154(b) by 480 days.

(21) Appl. No.: 14/434,809

(22) PCT Filed: Oct. 2, 2013

(86) PCT No.: PCT/EP2013/070587
§ 371 (c)(1),
(2) Date: Apr. 10, 2015

(87) PCT Pub. No.: WO2014/056782
PCT Pub. Date: Apr. 17, 2014

(65) Prior Publication Data
US 2015/0273522 A1    Oct. 1, 2015

(30) Foreign Application Priority Data
Oct. 10, 2012    (LU) .......................................... 92082

(51) Int. Cl.
*H05H 1/24* (2006.01)
*B05D 1/00* (2006.01)
(Continued)

(52) U.S. Cl.
CPC .................. *B05D 1/62* (2013.01); *B05D 5/00* (2013.01); *B05D 5/08* (2013.01); *C09D 5/00* (2013.01);
(Continued)

(58) Field of Classification Search
CPC ............... B05D 1/62; B05D 5/00; B05D 5/08
See application file for complete search history.

(56) References Cited

U.S. PATENT DOCUMENTS

2009/0068375 A1 * 3/2009 Dobbyn .................. B05D 1/62
427/489
2011/0171426 A1    7/2011 Chen et al.
(Continued)

FOREIGN PATENT DOCUMENTS

| DE | 102005026359 A1 | 12/2006 |
| FR | 2893266 A1 | 5/2007 |
| WO | 03002269 A2 | 1/2003 |

OTHER PUBLICATIONS

Fang et al. Dielectric Barrier Discharge in Atmospheric Air for Glass-Surface Treatment to Enhance Hydrophobicity, IEEE Transactions on Plasma Science, vol. 34, No. 4, Aug. 2006, pp. 1216-1222. (Year: 2006).*

(Continued)

*Primary Examiner* — Kelly M Gambetta
(74) *Attorney, Agent, or Firm* — Sandberg Phoenix & von Gontard P.C.

(57) ABSTRACT

The invention is directed to a method for manufacturing a hydrophobic or superhydrophobic surface comprising the steps of: (a) providing a substrate with a surface roughness $R_a$ between 0.1 and 1.0 μm and (b) exposing the substrate to a filamentary atmospheric pressure dielectric barrier discharge plasma which is fed by a reaction gas and siloxane-forming material in order to form a superhydrophobic siloxane layer over at least a portion of the surface of the (Continued)

substrate. Step (b) is operated with an electrical excitation frequency of 15,000 Hz to 35,000 Hz and a power density between 0.5 to 10 W·cm$^{-2}$. The siloxane layer produced in step (b) shows thereby a micro-structure and a nano-structure with droplet "sticking" properties (high water sliding angle).

12 Claims, 8 Drawing Sheets

(51) Int. Cl.
*B05D 5/00* (2006.01)
*B05D 5/08* (2006.01)
*C09D 5/00* (2006.01)
*C09D 5/16* (2006.01)
*C09D 183/04* (2006.01)

(52) U.S. Cl.
CPC ......... *C09D 5/1681* (2013.01); *C09D 183/04* (2013.01); *B05D 2350/38* (2013.01); *Y10T 428/24355* (2015.01)

(56) References Cited

U.S. PATENT DOCUMENTS

2011/0287203 A1    11/2011  Victor et al.
2012/0021177 A1*   1/2012   Kawai ................ C03C 17/42
                                              428/148

OTHER PUBLICATIONS

Morent et al. Plasma-Polymerization of HMDSO Using an Atmospheric Pressure Dielectric Barrier Discharge, Plasma Process. Polym. 2009, 6, pp. S537-S542. (Year: 2009).*
International Search Report from corresponding International Application No. PCT/EP2013/070587, dated Feb. 3, 2014.

* cited by examiner

Wenzel    Cassie-Baxter

METHOD FOR MANUFACTURING A SUPERHYDROPHOBIC SURFACE, SURFACE SO OBTAINED AND USE OF IT

CROSS-REFERENCE TO RELATED APPLICATIONS

The present invention is the US national stage under 35 U.S.C. § 371 of International Application No. PCT/EP2013/070587, which was filed on Oct. 2, 2013, and which claims the priority of application LU 92082 filed on Oct. 10, 2012, the content of which (text, drawings and claims) are incorporated here by reference in its entirety.

FIELD

The invention is directed to the treatment and manufacture of surfaces, more particularly to the treatment and manufacture of surfaces providing superhydrophobic properties. More specifically, the invention is directed to a method for manufacturing a superhydrophobic surface, the resulting superhydrophobic surface and the use of such surface.

BACKGROUND

Hydrophobicity is the physical property of a molecule, known as a hydrophobe, that is repelled from a mass of water. The hydrophobic interaction is mostly an entropic effect originating from the disruption of highly dynamic hydrogen bonds between molecules of liquid water by the non-polar solute. By aggregating together, non-polar molecules reduce the surface area exposed to water and minimize their disruptive effect. Thus, the two immiscible phases (hydrophilic vs. hydrophobic) will change so that their corresponding interfacial area will be minimal. This effect can be visualized in the phenomenon called phase separation in a mixture of water with a lipid solution. It can also be visualized in the nature by observing a water droplet on the hydrophobic surface of grass or a leave. A water droplet on a hydrophobic surface is illustrated in FIG. 1, left image. The contact angle θ or Water Contact Angle (WCA) can be studied by analyzing the forces acting on a fluid droplet resting on a solid surface surrounded by a gas.

Hydrophobicity depends not only on the composition of the surface contacting water but also on its physical topography. Wenzel has determined that when the liquid is in intimate contact with a micro structured or rough surface, θ will change to $\theta_{W^*} = r \cos \theta$, where r is the ratio of the actual area to the projected area (see FIG. 1, central image). Wenzel's equation shows that micro structuring a surface amplifies the natural hydrophobic tendency of the surface. According to the Wenzel model, the liquid droplet retains contact at all points with the rough hydrophobic solid surface increasing the interfacial energy and the Water Sliding Angle (WSA). The droplets "stick" therefore to the surface. To reduce the surface contact with the hydrophobic film, the droplet decreases its projected base area, increasing the WCA and the hydrophobic character of the film.

Cassie and Baxter found that if the liquid rests on the tops of microstructures (see FIG. 1, right image), θ will change to $\theta_{CB^*} = \varphi(\cos \theta + 1) - 1$, where φ is the area fraction of the solid that touches the liquid. Liquid in the Cassie-Baxter state is more mobile than in the Wenzel state. The droplet remains on top of the film protrusions, leading to a "slippy" (i.e. slippery) hydrophobicity characterized by low WSA and WCA hysteresis.

The WSA is a dynamic measure of hydrophobicity and is measured by depositing a droplet on a surface and tilting the surface until the droplet begins to slide. In general, liquids in the Cassie-Baxter state exhibit lower slide angles and contact angle hysteresis than those in the Wenzel state.

Contact angle is a measure of static hydrophobicity, and contact angle hysteresis and slide angle are dynamic measures.

The contact angle formed between a liquid and solid phase will exhibit a range of contact angles that are possible, corresponding to a hysteresis. There are two common methods for measuring this range of contact angles. The first method is referred to as the tilting base method. Once a drop is dispensed on the surface with the surface level, the surface is then tilted from 0° to 90°. As the drop is tilted, the downhill side will be in a state of imminent wetting while the uphill side will be in a state of imminent dewetting. As the tilt increases the downhill contact angle will increase and represents the advancing contact angle while the uphill side will decrease; this is the receding contact angle. The values for these angles just prior to the drop releasing will typically represent the advancing and receding contact angles. The difference between these two angles is the contact angle hysteresis. The second method is often referred to as the add/remove volume method. When the maximum liquid volume is removed from the drop without the interfacial area decreasing the receding contact angle is thus measured. When volume is added to the maximum before the interfacial area increases, this is the advancing contact angle.

The hydrophobic state according to the Wenzel model is therefore more "sticky" than the hydrophobic state according to the Cassie-Baxter model which is more "slippy".

It is commonly acknowledged that a hydrophobic surface is a surface that shows a WCA that is greater than 90° and a superhydrophobic surface is a surface with a WCA that is greater than 150°.

Superhydrophobic surfaces, such as the leaves of the lotus plant, are those that are extremely difficult to wet. Lotus leaves are covered of microscopic cells (3-13 μm) coated by nanoscopic wax crystals (100 nm). The WCA on a Lotus leaf can exceed 150° and the WSA can be less than 10°. This is referred to as the Lotus effect and corresponds to the Cassie-Baxter state.

The micropapillae (16 μm diameter and 7 μm height) and nanofolds (730 nm) present at the surface of the rose petals lead to a superhydrophobic surface with high adhesive force to water, i.e. high WSA, corresponding to the Wenzel state. Rose petals have the ability to grip water droplets in place. The droplets, which remain spherical in shape on the petal surface, do not roll off even if the petal is turned upside down.

Both the lotus leave and the rose petal show a double roughness or hierarchical structure as schematically illustrated in FIG. 2.

Several criteria have been developed for predicting whether the Wenzel or the Cassie-Baxter state will exist. Among those criteria one considers the height of the micro structure and another one focuses on the air-trapping capability under liquid droplets on rough surfaces.

The scientific publication "One-step process to deposit a soft super-hydrophobic film by filamentary dielectric barrier discharge-assisted CVD using HMCTSO as a precursor", (M. C. Kim, C.-P. Klages, Surface and Coatings Technology 204 (2009) 428-432.), describes the deposition of superhydrophobic films forming a double rough structure by means of a filamentary dielectric barrier discharge operating from 38,000 to 40,000 Hz fed with a cyclic organosilicon precursor, hexamethylcyclotrisiloxane (HMCTSO). The films grown on both silicon wafers (100) and stainless steel are superhydrophobic with WCA of 162° and 158° respectively. The morphology of the films described in this document compared well with the one observed at the surface of the Lotus leaf. This double rough structure is giving rise to the "slippy" superhydrophobic property, also called Lotus-effect. However, this process is relatively slow and the resulting coating can present some structural weaknesses. Additionally, this process does not allow obtaining surfaces with "sticky" superhydrophobic properties.

The patent application published US 2011/0171426 A1 discloses a method for manufacturing a hydrophobic surface. The method consists essentially in applying by atmospheric pressure plasma deposition on a substrate a first coating forming a hard and rough surface and after a second coating on the rough surface. The first coating has a roughness ranging from 9 nm to 1 µm. Like in the preceding teaching, this multi-steps process is relatively slow and does not lead to superhydrophobic surfaces.

The patent application published US 2011/0287203 A1 discloses a method for manufacturing a superhydrophobic and self-cleaning surface. The method involves essentially the imprinting of exposed surfaces with suitable fine-grained and/or amorphous metallic embossing dies to transfer a dual surface structure, including ultra-fine features less than or equal to 100 nm embedded in and overlaying a surface topography with macro-surface structure greater than or equal to 1 micron.

SUMMARY

The invention seeks to improve the manufacture of superhydrophobic surfaces with a double roughness. Moreover, the invention seeks to improve the wear resistance and mechanical properties of such surfaces. It seeks also to improve the method for manufacturing such surfaces. The invention seeks also to provide a superhydrophobic surface showing a high water sliding angle (i.e. which are "sticky").

The invention consists in a method for manufacturing a superhydrophobic layer comprising the steps of: (a) providing a substrate with a surface; (b) exposing the surface to a filamentary atmospheric pressure dielectric barrier discharge plasma which is fed by a gas flow comprising reaction gas and siloxane-forming material in order to form the superhydrophobic siloxane layer over at least a portion of the surface; wherein the surface of the substrate in step (a) has a roughness Ra between 0.1 and 1.0 µm, and step (b) is operated with an electrical excitation frequency of 15,000 Hz to 35,000 Hz and a power density between 0.5 to 10 W·cm$^{-2}$.

The roughness Ra of the surface of the substrate can be between 0.1 and 1.0 µm, e.g., between 0.1 and 0.5 µm, e.g., between 0.1 and 0.3 µm.

According to various embodiments of the invention, the superhydrophobic siloxane layer is achieved in step (b) by a single or multiple passages of the surface of the substrate through the plasma.

According to various embodiments of the invention, the concentration of the siloxane-forming material in the gas flow is comprised between 50 and 10,000 ppm.

According to other various embodiments of the invention, the superhydrophobic siloxane layer produced in step (b) shows a micro-structure and a nano-structure.

According to still other various embodiments of the invention, the substrate is made of aluminum and that the roughness Ra between 0.1 and 1.0 µm is achieved by cold-rolling. The roughness can also be achieved by extrusion, forging and/or casting.

The substrate can also be made of any metal, plastic, cardboard, wood, fabric or glass.

According to still other various embodiments of the invention, the reaction gas in step (b) comprises less than 500 ppm of oxygen.

According to still other various embodiments of the invention, the reaction gas in step (b) comprises nitrogen.

According to still other various embodiments of the invention, the electrical excitation frequency in step (b) is between 20,000 Hz to 30,000 Hz.

According to still other various embodiments of the invention, the siloxane-forming material in step (b) is a organosilicon gas, vapour, liquid or aerosol.

According to still other various embodiments of the invention, the siloxane-forming material in step (b) is selected from a group consisting of hexamethyldisiloxane, octamethylcyclotetrasiloxane, decamethylcyclopentasiloxane, dodecamethylcyclohexasiloxane, hexaethyldisiloxane, tetraethylorthosilicate, aminopropyl-trimethoxysilane, tetramethyldisiloxane, pentamethylcyclopentasiloxane, octamethylcyclooctasiloxane, polydimethylsiloxane and its derivatives, e.g., hexamethyldisiloxane.

According to still other various embodiments of the invention, the siloxane layer comprises agglomerated particles having a size between 50 and 750 nm.

According to still other various embodiments of the invention, the filamentary atmospheric pressure dielectric barrier discharge plasma in step (b) is operated with a power density between 1 to 5 W·cm$^{-2}$.

The invention consists also in a superhydrophobic surface manufactured according to the method of the present invention.

According to various embodiments of the invention, it exhibits a water contact angle of at least 150 degrees and/or a Wenzel-type superhydrophobicity.

The invention consists also in the use of a superhydrophobic surface according to the present invention in microliter liquid handling devices, droplet-based lab-on-chip technologies in biomedical technologies, self-cleaning surfaces, paint technology, glass engineering, corrosion protection, drop motion in micro-fluidic, and bio-devices to reduce protein coagulation.

The features of the invention are particularly advantageous in that they allow the manufacture of a superhydrophobic surface with a double roughness at reduced costs. Indeed, it has been discovered that starting from a surface with a roughness within the specified range and applying thereon a siloxane coating by filamentary atmospheric pressure dielectric barrier discharge (AP-DBD) plasma produces a surface exhibiting hydrophobic or superhydrophobic properties. This surface can be produced by a single or multiple passages through the plasma. The generated double roughness is particularly resistant and stable in time. The double roughness comprises a microstructure, i.e. with a roughness comprised between 1 and 999 µm, and a nanostructure present on the microstructure, with a roughness comprised between 1 and 999 nm.

The use of a specific range of frequency for the plasma allows achieving a particular nanostructure, more specifically a particular shape of these structures which render the surface either particularly "sticky", i.e. according to the Wenzel state or "slippy", i.e. according to the Cassie-Baxter state.

The invention permits therefore the manufacture at reduced cost of superhydrophobic surfaces exhibiting high WSA and/or high WCA hysteresis. Such surfaces are particularly interesting among others in the field of droplet-based lab-on-chips in biomedical technologies, paint technology, glass engineering, corrosion protection, drop motion in micro-fluidic, and bio-devices to reduce protein coagulation.

DRAWINGS

DETAILED DESCRIPTION

Figure 1:
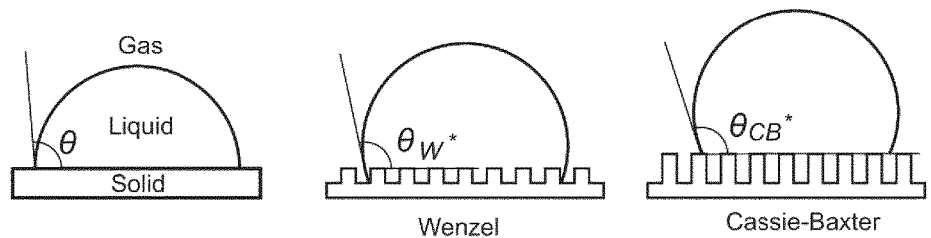
FIG. 1 illustrates the contact angle of a water droplet on a hydrophobic surface and on hydrophobic surfaces according to the Wenzel and Cassie-Baxter models.
Figure 2:
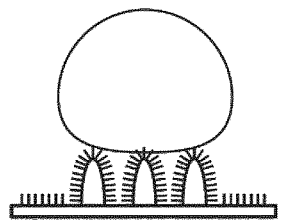
FIG. 2 illustrates a hierarchical structure or double roughness of a superhydrophobic surface.

FIGS. 1 and 2 which schematically illustrate the contact of a water droplet on a hydrophobic surface according to the Wenzel and Cassie-Baxter models as well as on a double rough structure have already been discussed in the section "Background art".

Figure 3:
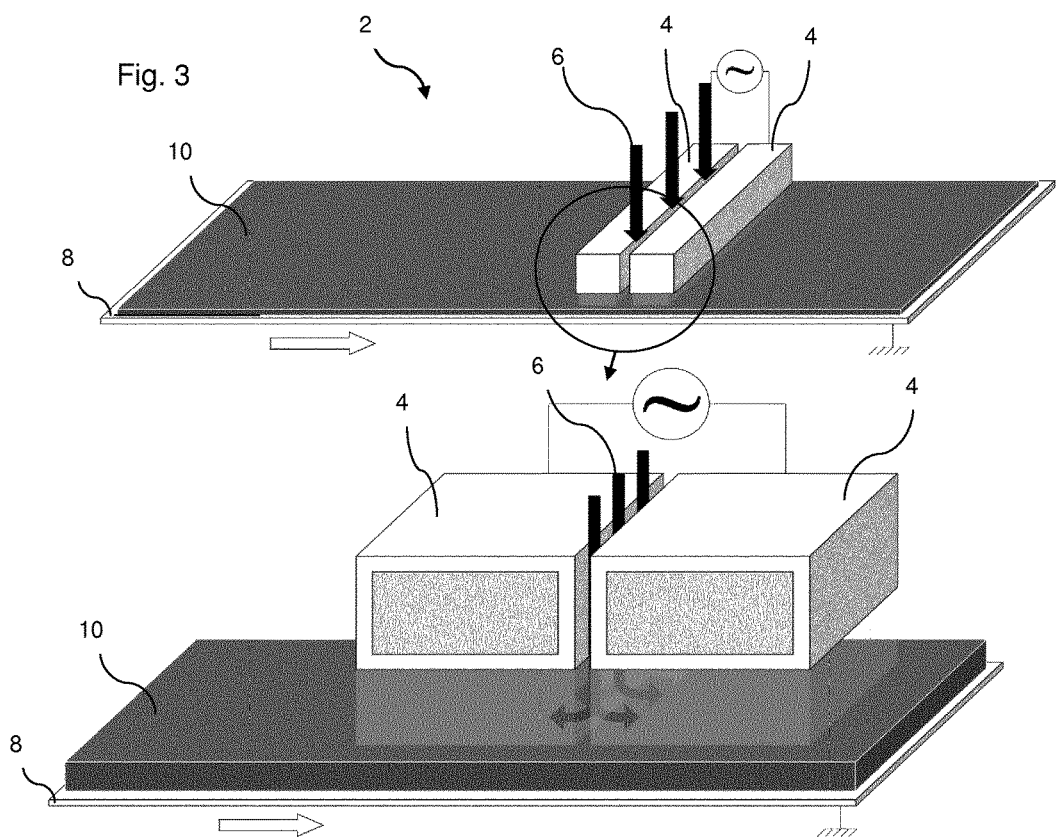
FIG. 3 is a schematic view of a filamentary atmospheric pressure dielectric barrier discharge reactor.

FIG. 3 illustrates a dielectric barrier discharge reactor 2 comprising two flat or cylindrical parallel high voltage electrodes 4 (for example 2×1.5×30 $cm^2$) covered with alumina and a moving table 8 as a grounded electrode. The dielectric barrier discharge (DBD) plasma operates at atmospheric pressure (AP) and is generated by supplying a reaction gas like nitrogen ($N_2$) into a discharge gap formed between a high voltage electrode 4 and a grounded electrode. Optionally, the moving table 8 can include a heating unit that allows the substrate 10 to be heated up to a temperature of 80° C. The plasma can be generated using for example a Corona generator 7010R from Softal Electronic GmbH generating a 10,000 to 100,000 Hz sinusoidal signal of 100 W.

A siloxane-forming material, like for example a hexamethyldisiloxane (HMDSO), is injected into the reactor using a classic bubbler system made of a cylinder and a frit (not illustrated). The respective flow rates of nitrogen through the process gas line and the HMDSO bubbler are kept constant to 19.5 L·min-1 and 0.5 L·min-1 (1000 ppm) respectively for all experiments. The siloxane-forming material, HMDSO, was obtained from Sigma-Aldrich and used without further purification (98%). Nitrogen (99.999%) gas can be obtained from Air Liquide. The deposition time is 60 seconds for all the experiments.

Deposition Experiments:

The substrates in the following examples were foils of an aluminium alloy. The precise composition of the aluminium alloy foil is not critical for the invention.

In these examples the aluminium alloy foil with a surface roughness Ra of 0.18 μm was obtained by cold rolling, but many other methods well known to the skilled person could be used to obtain the same kind of surface roughness. Polished aluminium foil with a surface roughness Ra of 0.06 μm was also used as a substrate to illustrate the effect of a smoother surface substrate.

The films were deposited on the foil substrates by submitting the substrates to dielectric barrier discharge plasma operating at atmospheric pressure under filamentary regime, as described above in relation with FIG. 3. The excitation frequency was set at various levels and the temperature within the plasma discharge apparatus was also set at two different levels. The substrate roughness and water contact angle of the siloxane layers produced for different frequencies and power densities are shown in Table 1.

TABLE 1

| Sample ID | Frequency [Hz] | Power density [W·$cm^{-2}$] | T [° C.] | $R_a$ [μm] [a] | $R_z$ [μm] [a] | WCA [°] |
|---|---|---|---|---|---|---|
| 1 | 10,000 | 1 | 20 | 0.06 [b] | 0.40 [b] | 98 |
| 2 | 10,000 | 1 | 20 | 0.18 | 0.89 | 112 |
| 3 | 10,000 | 1 | 80 | 0.18 | 0.89 | 103 |
| 4 | 22,500 | 1 | 20 | 0.06 [b] | 0.40 [b] | 103 |
| 5 | 22,500 | 1 | 21 | 0.18 | 0.89 | 151 |
| 6 | 22,500 | 0.9 | 80 | 0.18 | 0.89 | 155 |
| 7 | 30,000 | 1.5 | 21 | 0.18 | 0.89 | 150 |
| 8 | 40,000 | 1 | 21 | 0.18 | 0.89 | 102 |

[a] Measured by confocal microscopy
[b] Polished aluminium foil

Ra designates the arithmetic average of the absolute deviation from the mean line of all points of the profile.

Rz designates the arithmetic average of the five largest maximum peak-to-valley heights.

Samples 5 to 7 are in accordance with the invention whereas samples 1 to 4 and 8 are examples not being part of the invention.

Samples 2 and 3 show an increase of the WCA compared to sample 1. Samples 5, 6 and 7 show a substantial increase of the WCA compared to sample 4. It results that the use of a rough substrate (Ra of 0.18 µm) according to the invention increases the hydrophobic properties of the resulting surface.

In samples 5 and 6, the WCA is lowest, i.e. 151°, for the films formed at room temperature and slightly increased, i.e. to 155°, for the film deposited at 80° C.

Figure 4:
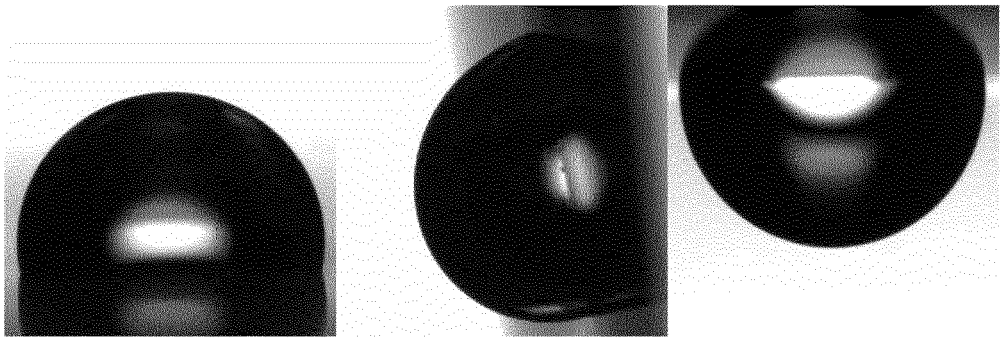
FIG. 4 shows water droplets on a first surface at different orientations, the surface being a siloxane film produced on a cold-rolled aluminium foil at electrical excitation frequency of 10,000 Hz according to a first sample (sample 2 of table 1) which is not part of the invention.
Figure 5:
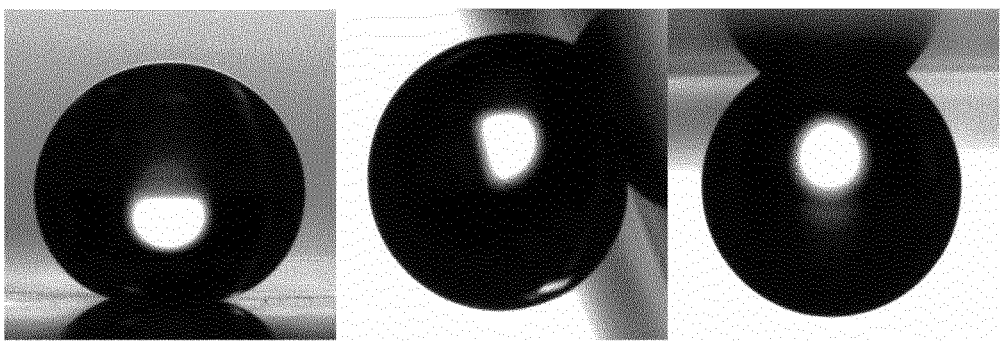
FIG. 5 shows water droplets on a second surface at different orientations, the surface being a siloxane film produced on a cold-rolled aluminium foil at electrical excitation frequency of 22,500 Hz according to a second sample (sample 5 in table 1) in accordance with various embodiments of the invention.

Additionally, like rose petals, the superhydrophobic surfaces of samples 5 and 6 obtained by the method according the invention have high adhesive force to water. During tilting experiments, it was observed that the water droplets clung to the surface, as shown in FIG. 5. FIG. 4 illustrates a 3 µL water droplet on a surface according one of the samples 2 and 3 which correspond to a hydrophobic surface (i.e. not superhydrophobic). For both FIGS. 4 and 5, the left image illustrates the droplet resting on the horizontally oriented surface, the central image illustrates the droplet sticking on the vertically oriented surface and the right image illustrates the droplet suspended at the reversed horizontally oriented surface. The spherical water droplet does not roll off nor slide on the PDMS coating, even when the surface was tilted at 90° or turned upside down. However, this effect failed for water droplets larger than 5 µL because the droplet's weight overcomes the adhesion forces of the PDMS films. After one year storage in air, new WCA and WSA measurements matched the observations made just after the film preparation, indicating the high chemical stability of the deposited films coatings.

Figure 6:
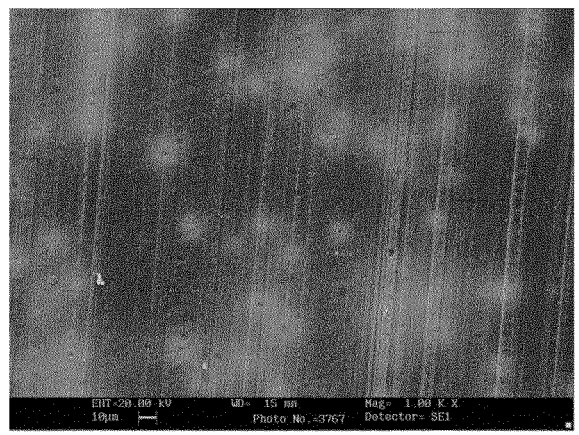
FIGS. 6 to 8 are a set of a scanning electron micrographs of the siloxane film produced on a cold-rolled aluminium foil at electrical excitation frequency of 10,000 Hz according to the first sample.
Figure 7:
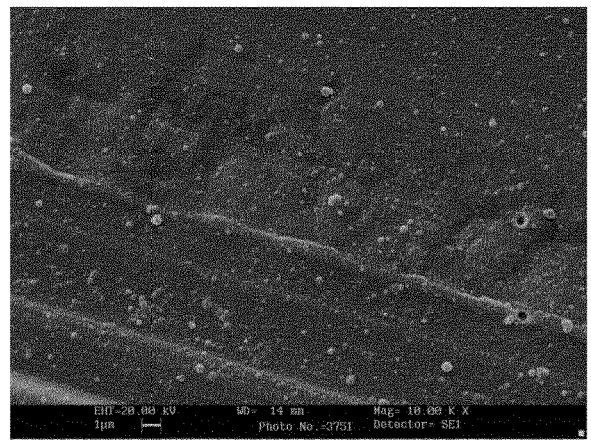
Figure 8:
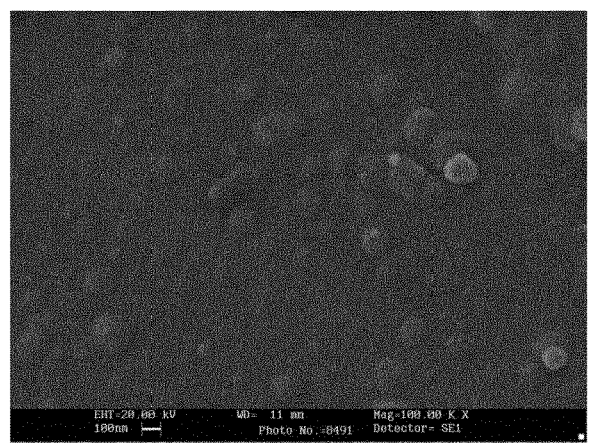
Figure 9:
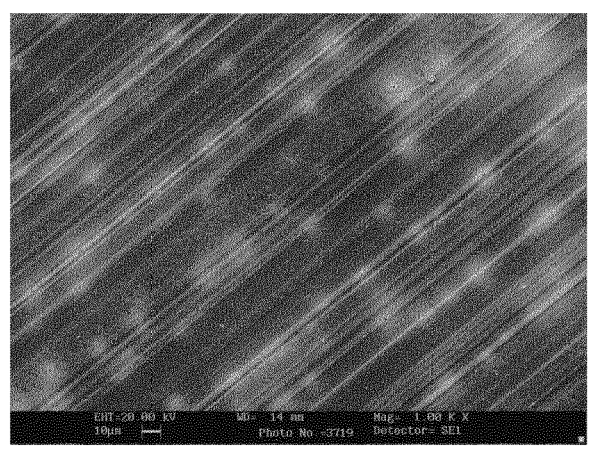
FIGS. 9 to 11 are a set of a scanning electron micrographs of the siloxane film produced on a cold-rolled aluminium foil at electrical excitation frequency of 22,500 Hz according to the second sample.
Figure 10:
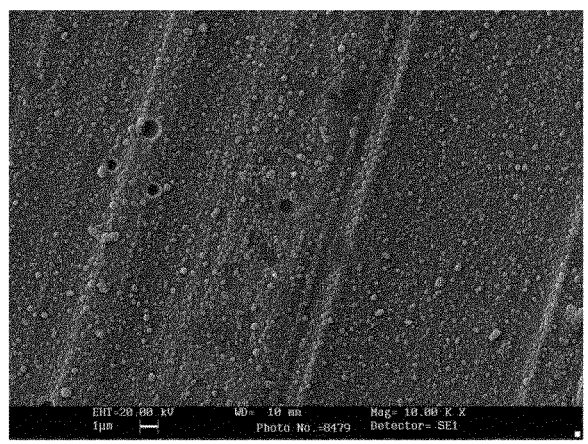
Figure 11:
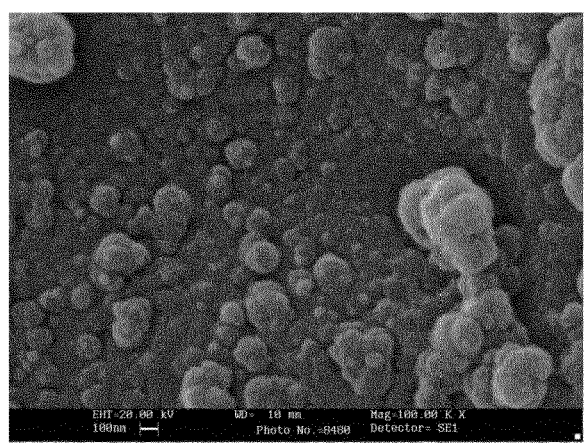
Figure 12:
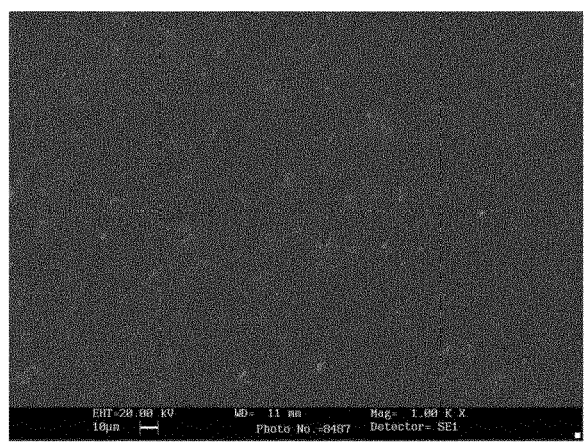
FIGS. 12 to 14 are a set of a scanning electron micrographs of the siloxane film produced on a polished aluminium foil at electrical excitation frequency of 22,500 Hz, this being a third sample (sample 4 in table 1) not being part of the invention.
Figure 13:
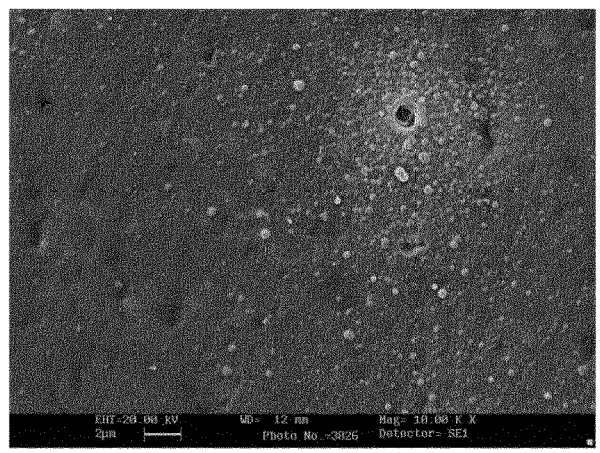

Evaluation of the Surfaces:

Scanning electron micrographs (SEM) of the aluminium foil substrates of sample 2 are shown in FIGS. 6 to 8 at different magnifications (indicated at the bottom left of each image). FIGS. 9 to 11 are corresponding SEMs of sample 5 and FIGS. 12 to 14 are corresponding SEMs of sample 4.

At low magnification, i.e. ×1,000 in FIGS. 6 and 9, the films deposited at 10,000 Hz and 22,500 Hz on the cold-rolled aluminum foils are indistinguishable from each other. It reveals long parallel rolling lines characteristic of cold rolled foil. The observed rolling lines are due to the topography transfer of the work rolls during the rolling process of the aluminum foil.

At a higher magnification, i.e. ×10,000 in FIGS. 7 and 10, pinholes surrounded by numerous particles are visible. They show a size distribution varying from 100 to 500 nm. The use in the reactor (FIG. 3, reference 2) of a reduced gap between the electrodes (about 1 mm) at atmospheric pressure and the high precursor concentration imply that the nitrogen plasma discharge operates in the filamentary mode. Under the filaments or current channels, electron and ion bombardment, pinholes and heterogeneities are formed in the film. As observed on the micrographs, in the early steps of the deposition process, the filaments, in various embodiments, anchor to surface defects and in particular to the rolling lines. Moreover, etching of the surface under the impact of the filaments induced a high concentration of condensable vapours, which quickly generated particles. The local higher power density at the filament position also induced a faster gas depletion and nucleation of particles.

Figure 14:
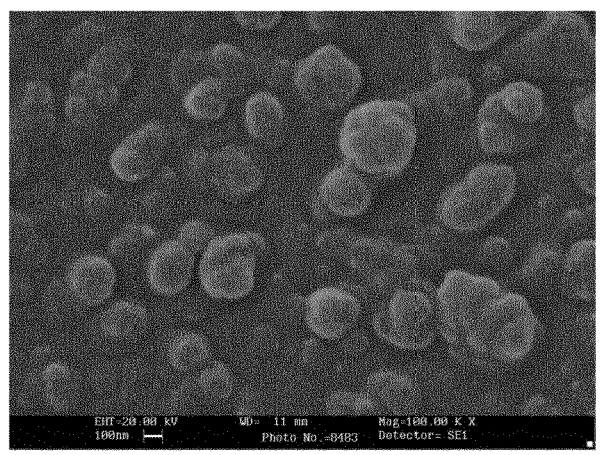

At even higher magnification, i.e. ×100,000, FIGS. 11 and 14 reveal that the films deposited using a 22,500 Hz frequency are composed of agglomerate particles. These particles, with sizes varying from 100 to 500 nm, are constructed from smaller agglomerated primary particles of about 50 nm. As is visible in FIG. 8, the film deposited at 10,000 Hz has a smoother appearance, with weaker evidence of particle formation. FIG. 12 shows in contrast that the film deposited on polished aluminum foil is relatively smooth and particle-free. However, the higher magnification SEM pictures in FIGS. 13 and 14 reveal that the films deposited on polished aluminum foil using a 22,500 Hz frequency are composed of 100 to 500 nm agglomerate particles made of smaller primary particles of about 50 nm. The SEM picture in FIG. 8 obtained at high magnification for the film formed with a 10,000 Hz frequency is smoother.

Evaluation of the Composition

Figure 15:
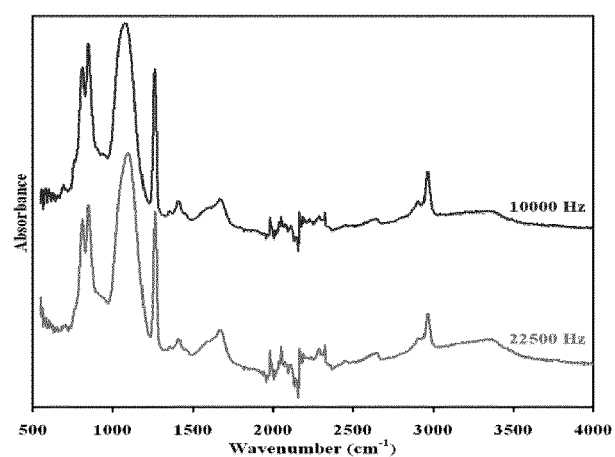
FIG. 15 is a Fourier transform infrared spectroscopy (FTIR) of the films according to the first and second samples, i.e. with a 10,000 Hz and 22,500 Hz respectively electrical excitation frequency on the cold-rolled aluminium foil.

FIG. 15 illustrates the Fourier Transformed InfraRed spectroscopy (FTIR) of the films according to the samples 2 and 5, i.e. with a 10,000 Hz and 22,500 Hz respectively electrical excitation frequency on the cold-rolled aluminum foil. The FTIR curves confirm the formation of PDMS-like thin films. All the spectra are almost identical with a broad and intense band between 1000 to 1200 cm-1 and a narrow peak at 1260 $cm^{-1}$. These peaks correspond respectively to different Si—O—Si chain vibrations and Si—$(CH_3)_2$ bending modes. The intense bands observed between 700 and 900 $cm^{-1}$ are attributed to vibrations from Si—O—Si (736 $cm^{-1}$), Si—$(CH_3)_1$ (778 $cm^{-1}$), ρ $(CH_3)$ and ν (Si—C) from Si—$(CH_3)_3$ (764 $cm^{-1}$; 830-850 $cm^{-1}$), Si—$(CH_3)_2$ (800 $cm^{-1}$; 904 $cm^{-1}$), δ (Si—O) (810-849 $cm^{-1}$) and δ (H—Si—O) (848 $cm^{-1}$; 890 $cm^{-1}$). Around 1400 $cm^{-1}$ and 2900 $cm^{-1}$, peaks with shoulders corresponding to asymmetrical $CH_3$ deformation vibrations and $CH_3$ stretching modes can be observed. The peaks observed at 1555 and 1655 $cm^{-1}$ demonstrate the existence of C=N ($sp^2$) bonds in all the films deposited.

FTIR shows that the large difference observed in the measured WCA is not related to any chemical disparity between the films produced, whereas SEM reveals some large differences in the morphology of the PDMS deposited.

Micron and Nanometer Length Scales of the Superhydrophobic Surfaces:

The micrometer and nanometer scale roughnesses observed by SEM can be also identified by confocal microscopy and atomic force microscopy (AFM).

Figure 16:
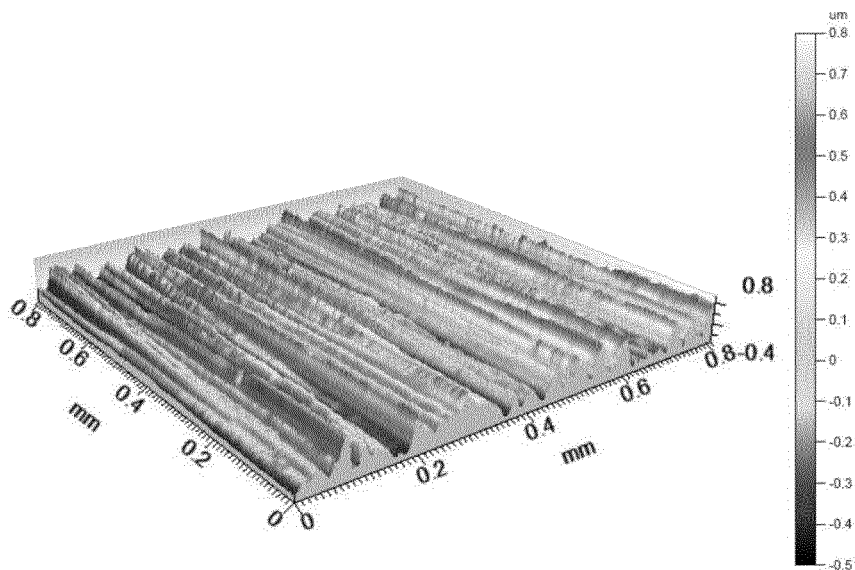
FIG. 16 is a confocal microscopy 3D topographic image of the siloxane film of FIGS. 9 to 11, formed according to the second sample, i.e. with a 22,500 Hz electrical excitation frequency on the cold-rolled aluminium foil.

FIG. 16 is a confocal microscopy 3D topographic image of the siloxane film of sample 5 (FIGS. 9 to 11), i.e. with a 22,500 Hz electrical excitation frequency on the cold-rolled aluminum foil. It shows long parallel rolling lines that cover the whole surface of the samples. The observed rolling lines are due to the topography transfer of the work rolls during the rolling process of the aluminum foil.

Figure 17:
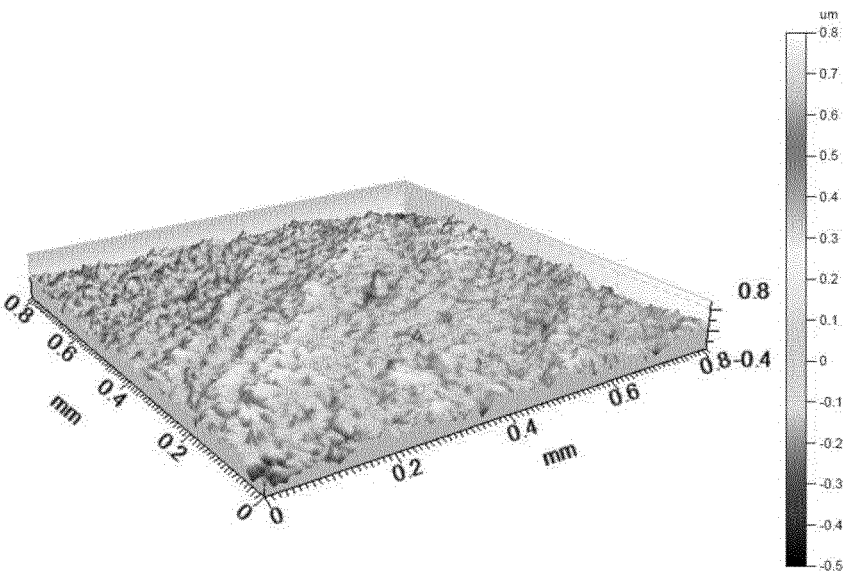
FIG. 17 is a confocal microscopy 3D topographic image of the siloxane film of FIGS. 12 to 14, formed according to the third sample, i.e. with a 22,500 Hz electrical excitation frequency on the polished aluminium foil.

FIG. 17 is a confocal microscopy 3D topographic image of the siloxane film of sample 4 (FIGS. 12 to 14), i.e. with a 22,500 Hz electrical excitation frequency on the polished aluminum foil. It shows a smoother surface, only covered by several smaller peaks.

The arithmetic average of the absolute deviation from the mean line of all points of the profile ($R_a$) and the arithmetic average of the five largest maximum peak-to-valley heights ($R_z$) are given in Table 1. The size of the rolling lines (10-20 µm wide and 1-1.5 µm height) observed on the roughness profile of the films prepared on the cold-rolled aluminum foil (FIG. 16) is consistent with the scale of the microscopic cells at the surface of the lotus leaf (3-11 µm diameter and 7-13 µm height) and the micropapillae of the rose petal (16 µm diameter and 7 µm height). While referring to these values, it can be noticed that similarly to the micropapillae observed on the rose petal, the rolling lines on the aluminum foil are wider than higher.

Figure 18:
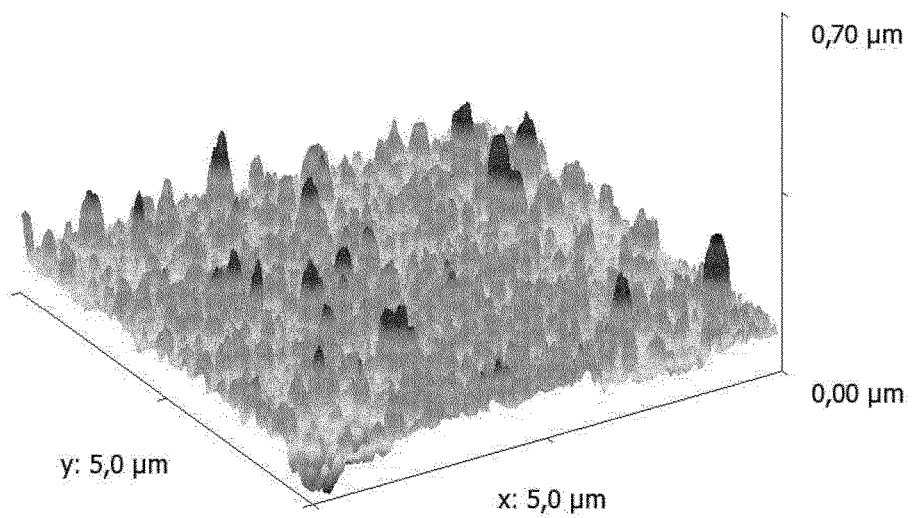
FIG. 18 is an atomic force microscopy (AFM) 3D topographic image of the films of FIGS. 6 to 8, formed according to the first sample.
Figure 19:
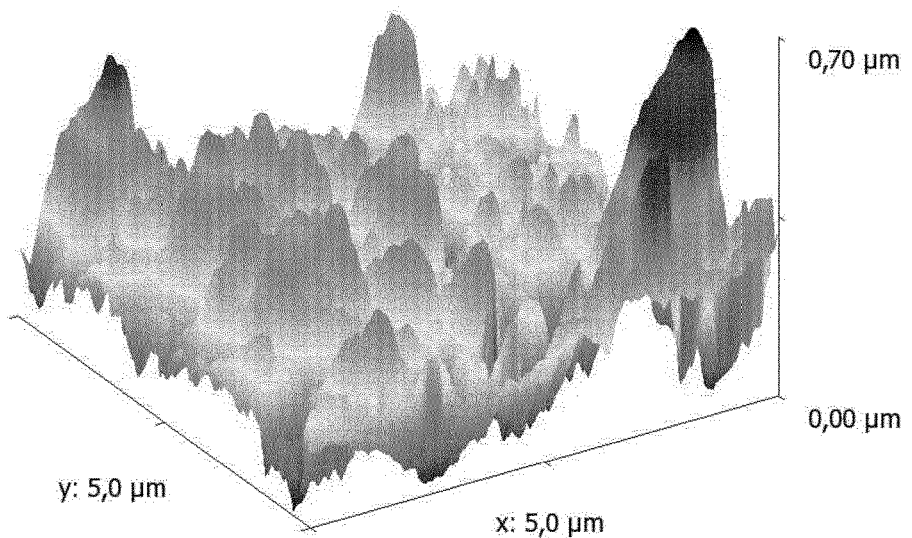
FIG. 19 is an atomic force microscopy (AFM) 3D topographic image of the films of FIGS. 9 to 11, formed according to the second sample.

FIGS. 18 and 19 are AFM 3D topographic images of the films according to sample 2 which is not part of the invention and sample 5 which is according to the invention, respectively. The AFM 3D topographic images of the films deposited at 22,500 Hz, irrespective of the aluminum substrate roughness, show a larger surface roughness than the film deposited a 10,000 Hz. The scale of the PDMS particles at the surface of the films (200-800 nm) is consistent with the size of the nanoscopic wax crystals of the lotus leaf (100 nm) and the nanofolds on the rose petal (730 nm). The roundness of the particles and the chink at their surfaces are quite comparable to the structure of the petal rose surface, whereas the nanoscopic wax crystals of the lotus leaf exhibit a needle-like morphology.

Confocal microscopy and AFM emphasis the importance of the dual-scale roughness as the superhydrophobic property was only achieved when nanometer scale features in addition of the micrometer features was constructed.

Figure 20:
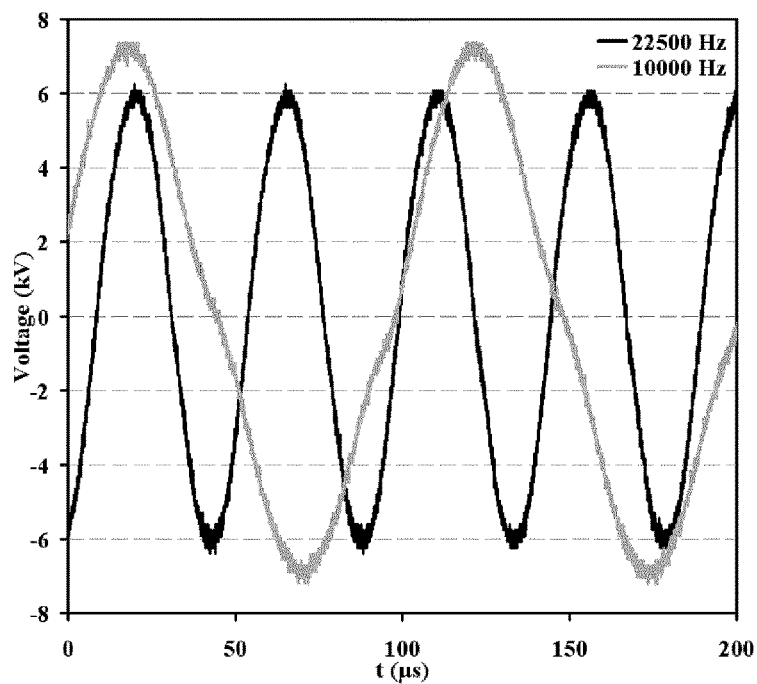
FIG. 20 shows for both first and second samples the measured gas applied external voltage waveforms.
Figure 21:
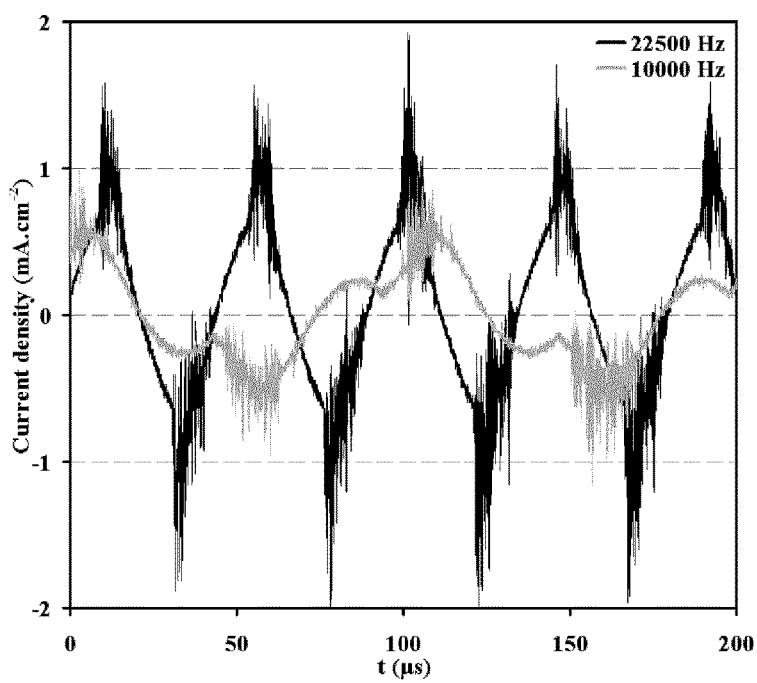
FIG. 21 shows for both first and second samples the current density of the plasma as a function of the frequency of the plasma electrical excitation.

Plasma Frequency and Formation of Rough PDMS Surfaces:

A double-roughness surface is important to achieve the desired superhydrophobic effect. It is the mechanism of polymer agglomeration that occurs during the DBD process that is the key to yielding such specific rough surfaces. The relatively high concentration of HMDSO used (1000 ppm) is known to favor the formation of particles in the gas phase. The high concentration of precursor induces the formation of a large amount of condensable species by the reaction with the reactive species produced by each filament of the AP-DBD. The high concentration of condensable species leads to high local concentration of nucleated particles, which grow by condensation and coagulation. The number of formed particles in the gas phase and at the surface of the film is therefore related to the precursor concentration, but also to the density and energy of the filaments of the AP-DBD. The mean dissipated power density, which is known to influence the formation of particles, has been kept constant to 1.1 W·cm$^{-2}$ for both frequencies studied. However the plasma gas current density as illustrated in FIG. 20 varied with the electrical excitation frequency. The maximum value of current density at 22,500 Hz (ca. 1.2 mA·cm$^{-2}$) was twice higher than the one measured at 10,000 Hz (ca. 0.6 mA·cm$^{-2}$). The current density variation, which is used to estimate the variation of plasma density according to discharge parameters, indicated the formation of larger amount of active species at 22,500 Hz. The higher concentration of active species and the high concentration of HMDSO lead to the formation of a higher density of particles at the highest plasma frequency, which increased the surface roughness.

The invention has been described above specifically in relation with an aluminum substrate. It is to be mentioned that the invention can also be applied on other type of substrates like copper, steel, cardboard, wood, polypropylene fabric and glass. Deposition tests have been successfully carried out on all these types of substrates and did all provide superhydrophobic properties with varying WSA going from 20° with substrates made of cardboard or wood to 90° (i.e. totally sticking) for a substrate made of electrodeposited copper foil.

What is claimed is:

1. A method for manufacturing a superhydrophobic layer, said method comprising:
   (a) providing a substrate with a surface;
   (b) exposing the surface to a filamentary atmospheric pressure dielectric barrier discharge plasma which is fed by a gas flow comprising reaction gas and siloxane-forming material in order to form a superhydrophobic siloxane layer over at least a portion of the surface, wherein the surface of the substrate in step (a) has a roughness $R_a$ between 0.1 and 1.0 µm, and wherein the filamentary atmospheric pressure dielectric barrier discharge plasma is operated with an electrical excitation frequency of 15,000 Hz to 35,000 Hz and a power density between 0.5 to 10 W·cm$^{-2}$.

2. The method according to claim 1, wherein the concentration of the siloxane-forming material in the gas flow comprises between 50 and 10,000 ppm.

3. The method according to claim 2, wherein the superhydrophobic siloxane layer shows a micro-structure and a nano-structure.

4. The method according to claim 3, wherein the substrate is aluminum foil and the roughness $R_a$ between 0.1 and 1.0 µm is achieved by cold-rolling.

5. The method according to claim 3, wherein the substrate comprises at least one of copper, steel, cardboard, wood, plastic, polypropylene fabric and glass.

6. The method according to claim 5, wherein the flow of gas comprises less than 500 ppm of oxygen.

7. The method according to claim 6, wherein the flow of gas comprises nitrogen.

8. The method according to claim 7, wherein the electrical excitation frequency is between 20,000 Hz to 30,000 Hz.

9. The method according to claim 8, wherein the siloxane-forming material is at least one of a organosilicon gas, vapour, liquid and aerosol.

10. The method according to claim 9, wherein the siloxane-forming material is selected from a group consisting of hexamethyldisiloxane, octamethylcyclotetrasiloxane, decamethylcyclopentasiloxane, dodecamethylcyclohexasiloxane, hexaethyldisiloxane, tetraethylorthosilicate, aminopropyltrimethoxysilane, tetramethyldisiloxane, pentamethylcyclopentasiloxane, octamethylcyclooctasiloxane, polydimethylsiloxane and its derivatives.

11. The method according to claim 10, wherein the siloxane layer comprises agglomerated particles having a size between 50 and 750 nm.

12. The method according to claim 11, wherein the filamentary atmospheric pressure dielectric barrier discharge plasma is operated with a power density between 1 to 5 W·cm$^{-2}$.

* * * * *